US006540802B2

(12) United States Patent
Trautmann et al.

(10) Patent No.: US 6,540,802 B2
(45) Date of Patent: Apr. 1, 2003

(54) AIR INTAKE SYSTEM INCLUDING A WATER SEPARATOR WITH AN INNER PIPE PROJECTING INTO AN OUTER PIPE

(75) Inventors: Pius Trautmann, Stuttgart (DE); Andreas Weber, Ludwigsburg (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/885,442

(22) Filed: Jun. 21, 2001

(65) Prior Publication Data

US 2002/0046724 A1 Apr. 25, 2002

(30) Foreign Application Priority Data

Jun. 21, 2000 (DE) .......................... 100 29 498

(51) Int. Cl.[7] .............................................. B01D 45/12
(52) U.S. Cl. ........................... 55/337; 55/396; 55/432; 55/457; 55/466
(58) Field of Search ..................... 55/396, 337, 432, 55/433, 466, 457

(56) References Cited

U.S. PATENT DOCUMENTS

| 3,885,934 A | * | 5/1975 | Eads et al. ..................... 55/392 |
| 4,255,174 A | | 3/1981 | Simpson |
| 4,311,494 A | * | 1/1982 | Conner et al. ................. 55/394 |
| 4,971,603 A | * | 11/1990 | Prinsloo et al. ............... 55/337 |
| 6,083,291 A | * | 7/2000 | Okada et al. .................. 55/337 |

FOREIGN PATENT DOCUMENTS

| DE | 3920767 | 1/1991 |
| EP | 0965378 | 12/1999 |
| FR | 887574 | 11/1943 |
| JP | 59203860 | 11/1984 |
| WO | 96/11047 | 4/1996 |

OTHER PUBLICATIONS

Search Report.

* cited by examiner

Primary Examiner—Robert A. Hopkins
(74) Attorney, Agent, or Firm—Crowell & Moring LLP

(57) ABSTRACT

The invention relates to an intake system for an internal combustion engine of a motor vehicle for separating entrained water droplets. The intake system has an untreated air intake (10), an untreated air pipe (11) connected to said untreated air intake (10), and a water separator (12) adjoining said untreated air pipe (11). Inside the untreated air pipe (11) a swirl is produced to cause the aspirated air to rotate inside the untreated air pipe (11). The untreated air pipe (11) communicates with the internal combustion engine. The water separator (12) has an inner pipe (13) and an outer pipe (14), which are arranged coaxially to one another. The inner pipe (13) protrudes into the outer pipe (14), which is provided with a water outlet (20). Due to the coaxial construction of the water separator (12), the intake air flows into the downstream components without being diverted, so that no appreciable pressure losses are caused.

9 Claims, 4 Drawing Sheets

AIR INTAKE SYSTEM INCLUDING A WATER SEPARATOR WITH AN INNER PIPE PROJECTING INTO AN OUTER PIPE

BACKGROUND OF THE INVENTION

The present invention relates to an intake system for an internal combustion engine of a motor vehicle having an intake for untreated air, an untreated air pipe connected to the untreated air intake and communicating with the internal combustion engine, and a water separator adjoining the untreated air pipe, in which a swirl can be produced inside the untreated air pipe.

JP 59203860 discloses an intake system for an internal combustion engine of a motor vehicle, which is provided with an air intake. The air intake is arranged in the front area of the vehicle, so that air is forced into the air intake during travel. From the air intake, the air is guided tangentially in a connecting pipe to a cylindrical water separator. Inside the water separator, the air is set into rotation, which causes the water droplets contained in the air to impact against the cylindrical water separator and to be discharged via the automatic water discharge valve arranged at the lower end of the water separator. The dehumidified air flows through a connecting line centrally disposed in the water separator into an intake line, which is connected to the internal combustion engine. The connecting line protrudes into the water separator, so that the air, prior to entering the connecting line, must change its radial flow direction to an axial flow direction.

This abrupt change in the flow direction causes a substantial pressure loss in the intake system, so that less air can be supplied to the engine, or the intake system has to be more amply dimensioned. Further, there is a risk that water droplets may be deposited along the connecting line, which protrudes into the water separator. These water droplets are then entrained by the air entering the connecting line, so that the separation efficiency of the water separator is impaired.

SUMMARY OF THE INVENTION

The object of the invention is to provide an air intake which overcomes the aforementioned drawbacks.

A particular object of the invention is to provide an air intake which can effect separation of water droplets from the aspirated air without an excessive pressure loss.

Another object of the invention is to provide an air intake which can maintain a high degree of separation efficiency and avoid re-entrainment of separated water droplets.

A further object of the invention is to provide an air intake which can effectively separate water droplets from aspirated air while taking up only a small amount of space.

These and other objects are achieved by the invention as described and claimed hereinafter.

In particular, the objects have been achieved in accordance with the present invention by providing an intake system for an internal combustion engine of a motor vehicle comprising an untreated air intake, an untreated air pipe connected to the untreated air intake, and a water separator adjoining the untreated air pipe, wherein a swirl can be produced inside the untreated air pipe, and wherein the untreated air pipe communicates with the internal combustion engine, and wherein the water separator comprises an inner pipe and an outer pipe, which are arranged in axial direction to one another, and the inner pipe projects into the outer pipe, and the outer pipe is provided with a water outlet.

The intake system for an internal combustion engine of a motor vehicle according to the invention comprises at least one intake for untreated air and an untreated air pipe, which is connected to the untreated air intake and communicates with the internal combustion engine. In special embodiments, the untreated air intake is arranged in the front area of the motor vehicle, so that the intake air is forced into the intake system during travel and more air can be supplied to the internal combustion engine. Since water spray produced in this frontal air intake (particularly small water droplets mixed with the intake air, caused for instance by another vehicle driving ahead, or a wet road, or a strong rainfall) will reach the intake system, a water separator connected to the untreated air pipe is provided. The untreated air pipe is configured in such a way that a swirl can be produced in it. This swirl can be generated, for instance, by a special configuration of the untreated air pipe, particularly by two 90° bends in the 3-dimensional volume. It is also possible, however, to provide means for producing such a swirl, e.g., guide vanes that are arranged inside the untreated air pipe. The swirl must set the intake air into a rotation that is sufficient to fling the water droplets contained in the intake air against the wall of the untreated air pipe. This causes the water droplets to be deposited along the wall, so that the intake air in the central area of the untreated air pipe no longer contains any water droplets.

The water separator comprises an inner pipe and an outer pipe, which are arranged in axial direction, particularly coaxially, to one another. The imaginary center axes can be mutually offset in their height as well as in their angle to one another. An advantageous embodiment provides for a concentric configuration of the imaginary center axes. The inner pipe together with the outer pipe can be constructed as an integral part or a multi-sectioned part. The water separator can, for instance, be made entirely of plastic or metal, or it can be formed from a combination of different materials. Due to the construction of the water separator, which is mutually arranged in axial direction, the intake air within the water separator is not deflected, so that no pressure losses occur. Further, the water separator is arranged coaxially to the untreated air intake. The inner pipe protrudes into the outer pipe, and the outer pipe is provided with a water outlet through which the separated water is removed from the intake system. To discharge the water from the outer pipe, the water outlet can be connected, for instance via a connecting line, to a water collecting basin, a water consumer, or to the environment. The cross-sections of the untreated air pipe as well as of the inner pipe and the outer pipe can have any desired configuration; for example, oval or polygonal cross sections may be used. Advantageously, cross sections, which only negligibly affect the swirl, are selected. Particularly advantageous is a circular embodiment of the cross sections, which does not influence the swirl and thus produces the lowest friction losses and the best separation results.

The water droplets that have already been deposited along the wall of the untreated air intake are transported by the airflow to the water outlet, where they are discharged from the intake system. The intake system according to the invention permits simple and cost-effective water removal from the aspirated air. It makes it possible to minimize pressure losses and requires hardly any installation space for the water-separating components. Moreover, this type of water separation is maintenance-free.

Advantageously, the outer pipe has a diverging or expanding separation area, so that the water deposited along the wall can no longer be entrained into the intake air. The expanding separation area is configured in such a way that the airflow does not stall. For instance, diverging angles of 0° to 60° may be realized. Angles of divergence ranging from 20° to 30° create particularly advantageous separation efficiencies.

According to another embodiment of the invention, the inner pipe has a diverging or expanding deceleration area to compensate pressure losses in the intake air. In the deceleration area, the cross-section is enlarged, so that the intake airflow is slowed and a pressure increase is produced. This improves the charging of the intake system and thus the internal combustion engine.

In a further variant of the invention, a splash collar is arranged on the inner pipe in order to prevent the separated water from flowing back into the dehumidified intake air. This splash collar is configured in such a way that it prevents water from reaching the inner pipe, even if the amount of collected water is relatively large.

Advantageously, the water outlet is tangentially arranged in swirl direction, which causes the separated water to be pressed into the water outlet by the swirl. A funnel-shaped water outlet is particularly advantageous, since the water reaches the water outlet not only due to the swirling force but also due to its own weight.

In accordance with a further embodiment of the invention, the water outlet is provided with a discharge valve which opens the water outlet in only one direction and is provided with a pressure control element, so that no air can be sucked in via the water outlet. The required opening pressure of the discharge valve corresponds to at least the resistance in the untreated air pipe.

In one specific embodiment of the invention, the inner pipe is connected directly to a filter housing disposed downstream from the water separator, so that the dehumidified air can flow directly into the filter housing where it is filtered. The connection of the water separator to the filter housing makes it possible to reduce the number of components, since it eliminates the connecting pieces for the water separator.

According to an advantageous embodiment of the invention, the outer pipe has a cylindrical outer area with a first diameter. This cylindrical outer area is connected on the one end to the untreated air pipe and on the other end to the separation area. The separation area is conical and has a second diameter, which is greater than the first diameter. Further, the outer pipe has a discharge area with a third diameter, which is connected to the second diameter. The third diameter, however, is larger than the second diameter so as to produce a water trailing edge. This water trailing edge prevents the separated water from getting into the inner pipe. The inner pipe has a cylindrical inlet area with a first inside diameter, which inlet area protrudes beyond the water trailing edge. The inlet area is connected to a conical deceleration area. The deceleration area is adjoined by an outlet area with a second inside diameter on the opposite side from the inlet area. The first inside diameter is smaller than the second inside diameter. Furthermore, the inner pipe is connected to the outer pipe so as to form a seal.

Advantageously, the first diameter of the outer pipe is larger than the first inside diameter of the inner pipe. This has the effect that only the dehumidified air reaches the intake area, and water droplets are not entrained.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
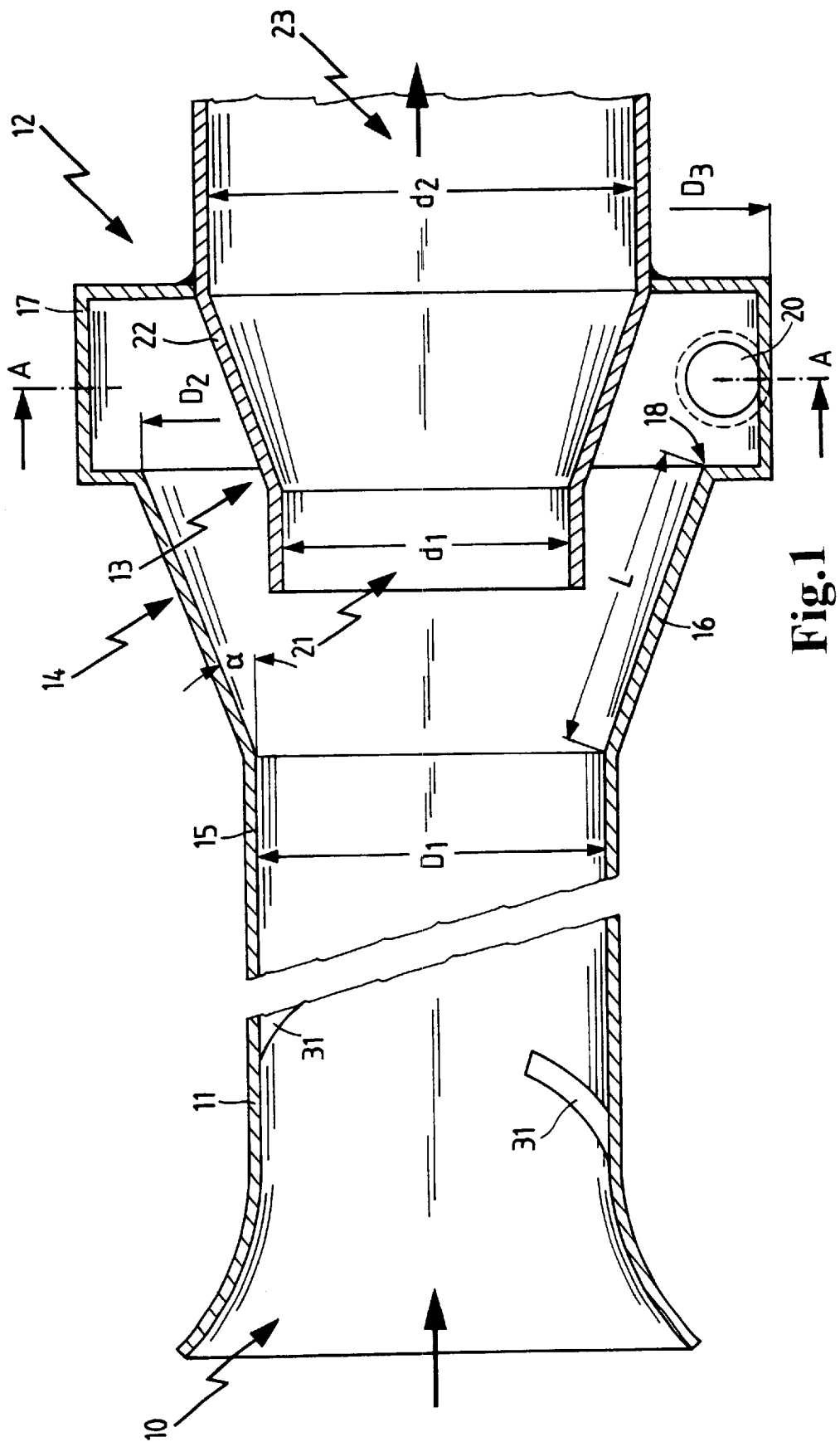
FIG. 1 is a cross section of an intake system according to the invention.

FIG. 1 is a cross section of an intake system. The intake system has an intake 10 for untreated air, which opens into an untreated air pipe 11. The untreated air pipe communicates with an internal combustion engine of a motor vehicle (not shown). The untreated air pipe 11 is adjoined by a water separator 12, which comprises an inner pipe 13 and an outer pipe 14. The outer pipe 14 in this example forms an integral part with the untreated air intake pipe 11. The inner pipe 13 is inserted into the outer pipe 14 and is welded together with the outer pipe to form a seal. This prevents the inner pipe 13 from being accidentally dislodged from the outer pipe 14. It is also possible, however, to use any other detachable or non-detachable connection for connecting the outer pipe 14 with the inner pipe 13.

Inside the untreated air pipe 11, the air entering in the direction of the arrow is set into a swirling motion. This swirling motion is produced by guide vanes 31, which are arranged inside the untreated air pipe 11. The guide vanes 31 can be formed as a plurality of correspondingly shaped and arranged individual guide vanes. However, a one-piece guide vane 31 protruding over a relatively long area of the untreated air pipe 11 is also feasible. Due to the swirl of the air, the water droplets contained in the air are flung in an outward direction where they are deposited along the untreated air pipe 11.

The outer pipe 14 of water separator 12 has a cylindrical outer area 15 with a first diameter D1, which is connected without any transition to untreated air pipe 11. The cylindrical outer area 15 is adjoined by a conically shaped separation area 16, which ends in a second diameter D2. The separation area 16 has an angle of divergence α, which is preferably between 20° and 30°. Angle α should be selected such that the water flows without stalling from cylindrical outer area 15 into separation area 16. Length L of separation area 16 should be selected in such a way that it is adequate for separating the water. Separation area 16, in the area of the second diameter D2, is adjoined by a discharge area 17, which has a diameter D3. Diameter D3 is greater than diameter D2 so that a water trailing edge 18 is formed. In the cylindrical discharge area 17 a water outlet 20 is tangentially arranged in the swirl direction, so that the separated water is removed from the intake system with the aid of the swirl.

The inner pipe 13 has a cylindrical inlet area 21 with a first inside diameter d1. This first inside diameter d1 is smaller than the first diameter D1. The inlet area 21 is adjoined by a conical deceleration area 22 in which the air that has entered inlet area 21 is slowed to achieve improved charging of the internal combustion engine. The deceleration area 22 is adjoined by an outlet area 23 with a second inside diameter d2. This outlet area 23 can, for instance, open out into a filter housing (as shown in FIG. 3), and an intake air diffuser (not shown) can be arranged downstream.

Figure 2:
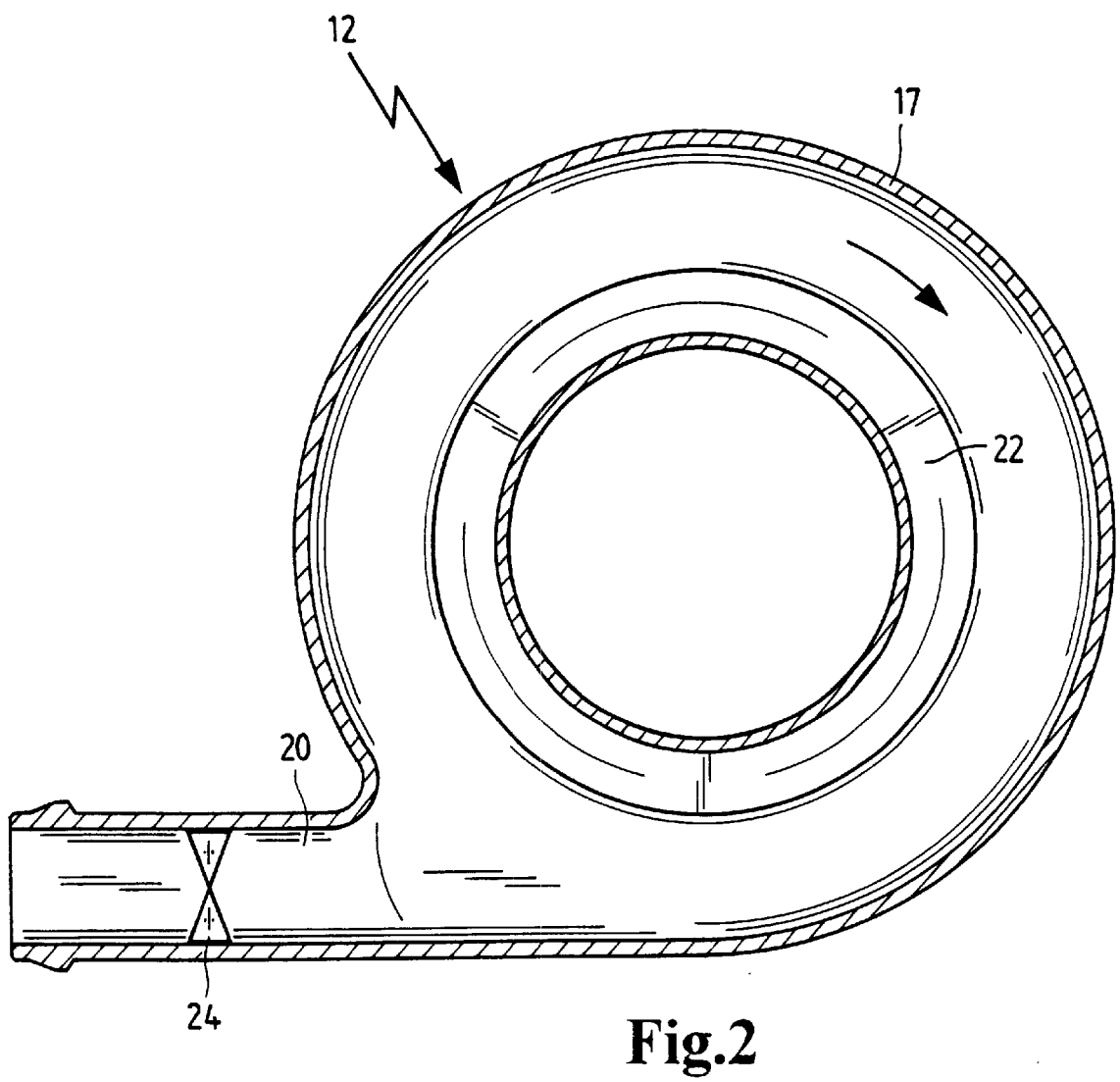
FIG. 2 is a cross section of a water separator taken along the section line A—A of FIG. 1.

FIG. 2 is a cross-section of a water separator 12 taken along section line A—A of FIG. 1. Components corresponding to those of FIG. 1 are provided with the same reference numbers. The swirl of the aspirated air flows in the direction indicated by the arrow, so that the water is pressed into the water outlet 20. To prevent air from being discharged through water outlet 20, a discharge valve 24 is provided. This discharge valve 24 opens only if the water pressure is greater than the air resistance in the untreated air pipe 11. A further means for preventing air from being discharged through the water outlet is, for instance, a siphon.

To improve the water discharge, water outlet 20 can have the shape of a funnel (not depicted). This funnel-shaped configuration calms the water in this zone, so that the water can be discharged without turbulence. The opening of the funnel is arranged in such a way that it extends tangentially to the discharge area 17 of the water separator. Furthermore, the opening can start at half the diameter of the discharge area 17 to create a soft transition between the discharge area 17 and the water outlet 20. The funnel can be designed so that it preferably has the same width as the discharge area 17.

Figure 3:
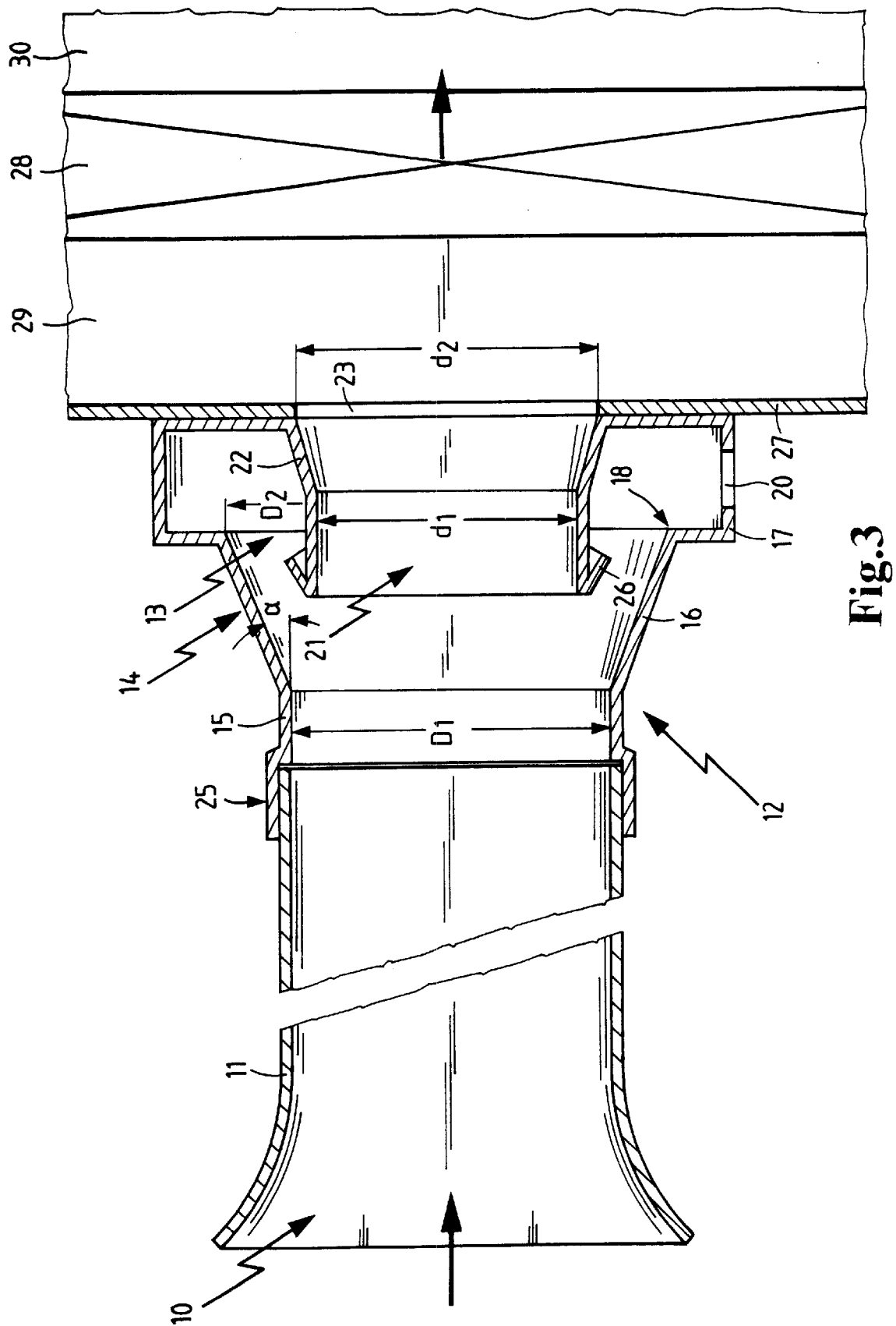
FIG. 3 is a cross section of another intake system embodiment according to the invention.

FIG. 3 is a cross section of another intake system according to the invention. Components corresponding to those of FIG. 1 are provided with the same reference numbers. In this embodiment, the water separator 12 is connected to untreated air pipe 11 by means of a plug-in connection 25 so as to form a seal. The water separator 12 is constructed in one piece, so that the outer pipe 14 and the inner pipe 13 are permanently connected to one another.

Furthermore, in contrast to FIG. 1, this embodiment has a splash collar 26 which encircles the inlet area 21 so that water droplets dripping from the discharge area 17 onto the inner pipe 13 do not get into the inlet area.

A further distinction with respect to FIG. 1 is that the water separator 12 is connected directly to a filter housing 27. The filter housing 27 contains a filter element 28, which separates an unfiltered side 29 from a filtered side 30 forming a seal.

Furthermore, water outlet 20 is designed as an opening arranged in the downward pointing area. This opening may, for instance, be connected to a water hose, which discharges the water.

Figure 4:
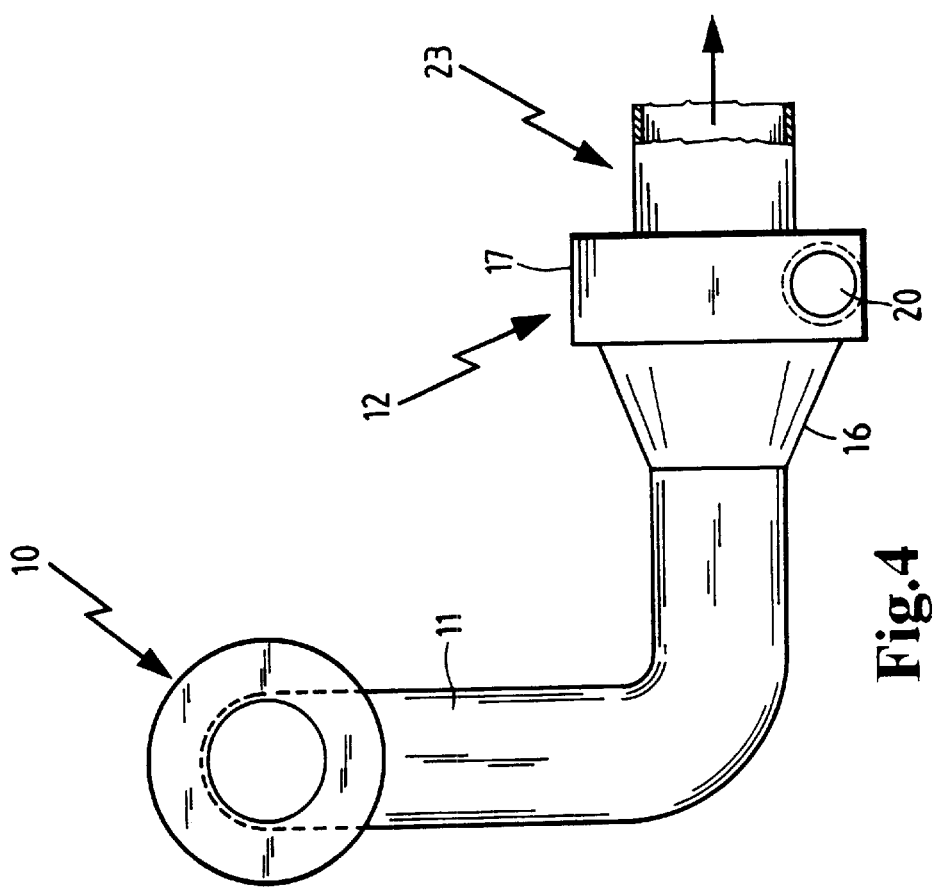
FIG. 4 is a schematic front view of an intake system according to the invention.

FIG. 4 is a schematic front view of an intake system according to the invention. Components corresponding to those of FIG. 1 are provided with the same reference numbers. The intake system has an untreated air pipe 11 with an untreated air intake 10. The untreated air pipe 11 has two 90° angles for producing a swirl in the intake air. The 90° angles are arranged in the three-dimensional volume.

Figure 5:
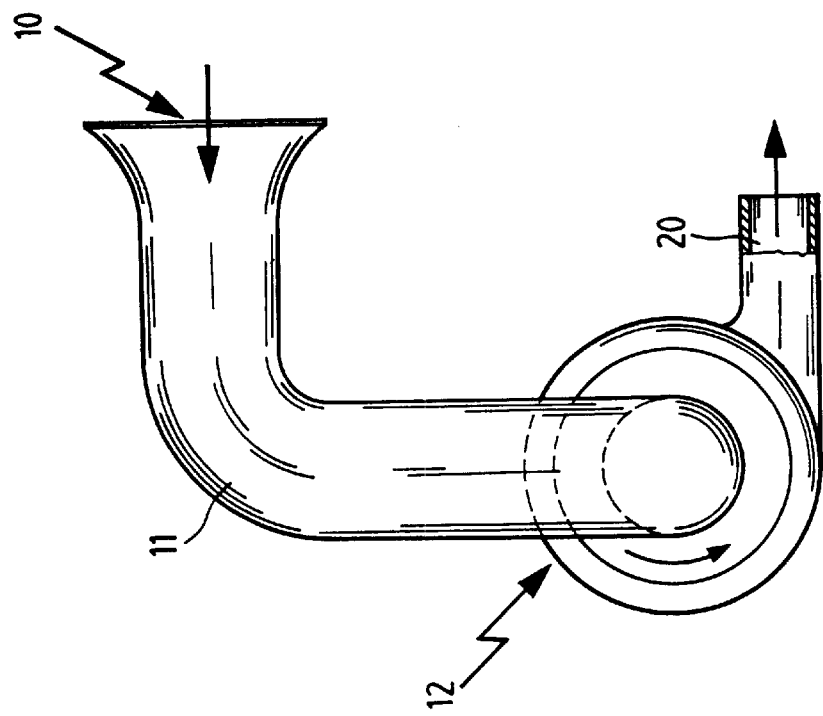
FIG. 5 is a schematic side view of the intake system of FIG. 4.

FIG. 5 is a schematic side elevation of the intake system of FIG. 4. Components corresponding to those of FIG. 4 are provided with the same reference numbers. The 90° angles produce a swirl, which in this embodiment extends in the direction of the arrow.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An intake system for an internal combustion engine of a motor vehicle comprising an untreated air intake, an untreated air pipe connected to said untreated air intake, a water separator adjoining said untreated air pipe, and means for producing a swirl inside said untreated air pipe, wherein said untreated air pipe communicates with the internal combustion engine, and wherein said water separator comprises an inner pipe and an outer pipe, which are arranged in axial direction to one another, and the inner pipe projects into the outer pipe, and the outer pipe is provided with a water outlet arranged tangentially in the direction of the swirl.

2. An intake system according to claim 1, wherein the outer pipe has a diverging separation area.

3. An intake system according to claim 1, wherein the inner pipe has a diverging deceleration area.

4. An intake system according to claim 1, further comprising a splash collar arranged on the inner pipe.

5. An intake system according to claim 1, further comprising a discharge valve in the water outlet.

6. An intake system according to claim 1, wherein the outer pipe has a cylindrical outer area with a first diameter (D1), said cylindrical outer area being connected at one end with the untreated air pipe and at the other end with the separation area, wherein said separation area is conically shaped and has a second diameter (D2), which is larger than said first diameter (D1), and wherein the outer pipe has a discharge area with a third diameter (D3), which is connected to the second diameter, said third diameter (D3) being larger than said second diameter (D2); said inner pipe having a cylindrical inlet area with a first inside diameter (d1), and wherein said inlet area is connected to a conical deceleration area, and said deceleration area being adjoined by an outlet area having a second inside diameter (d2); said first inside diameter (d1) being smaller than the second inside diameter (d2); and said inner pipe being connected to the outer pipe so as to form a seal.

7. An intake system according to claim 6, wherein said first diameter (D1) of said outer pipe is larger than said first inside diameter (d1) of said inner pipe.

8. An intake system for an internal combustion engine of a motor vehicle comprising an untreated air intake, an untreated air pipe connected to said untreated air intake, a water separator adjoining said untreated air pipe, and means for producing a swirl inside said untreated air pipe, wherein said untreated air pipe communicates with the internal combustion engine, and wherein said water separator comprises an inner pipe and an outer pipe, which are arranged in axial direction to one another, and the inner pipe projects into the outer pipe, and the outer pipe is provided with a funnel-shaped water outlet.

9. An intake system for an internal combustion engine of a motor vehicle comprising an untreated air intake, an untreated air pipe connected to said untreated air intake, a water separator adjoining said untreated air pipe, and means for producing a swirl inside said untreated air pipe, wherein said untreated air pipe communicates with the internal combustion engine, and wherein said water separator comprises an inner pipe and an outer pipe, which are arranged in axial direction to one another, and the inner pipe projects into the outer pipe, and the outer pipe is provided with a water outlet, and wherein the inner pipe is connected directly to a filter housing arranged downstream from the water separator.

* * * * *